United States Patent
Newton et al.

(10) Patent No.: US 10,148,728 B2
(45) Date of Patent: Dec. 4, 2018

(54) NETWORK ADDRESS RESOLUTION

(71) Applicant: Level 3 Communications, LLC, Broomfield, CO (US)

(72) Inventors: Christopher Newton, Westlake Village, CA (US); William R. Power, Boulder, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 91 days.

(21) Appl. No.: 14/986,015

(22) Filed: Dec. 31, 2015

(65) Prior Publication Data

US 2016/0191456 A1 Jun. 30, 2016

Related U.S. Application Data

(60) Provisional application No. 62/098,940, filed on Dec. 31, 2014.

(51) Int. Cl.
*G06F 15/173* (2006.01)
*H04L 29/08* (2006.01)
*H04L 29/12* (2006.01)

(52) U.S. Cl.
CPC .......... *H04L 67/02* (2013.01); *H04L 61/1511* (2013.01); *H04L 61/3055* (2013.01); *H04L 61/305* (2013.01)

(58) Field of Classification Search
CPC ... H04L 67/02; H04L 61/1511; H04L 61/3055
USPC ........................................ 709/225, 226, 229
See application file for complete search history.

(56) References Cited

U.S. PATENT DOCUMENTS

| | | |
|---|---|---|
| 6,185,598 B1 | 2/2001 | Farber et al. |
| 6,654,807 B2 | 11/2003 | Farber et al. |
| 7,013,289 B2 * | 3/2006 | Horn .................... G06Q 10/087 705/14.51 |
| 7,054,935 B2 | 5/2006 | Farber et al. |
| 7,546,576 B2 * | 6/2009 | Egli ........................ H04L 29/06 715/239 |
| 7,594,011 B2 | 9/2009 | Chandra |
| 7,945,693 B2 | 5/2011 | Farber et al. |
| 7,949,779 B2 | 5/2011 | Farber et al. |
| 8,060,613 B2 | 11/2011 | Farber et al. |
| 8,250,211 B2 | 8/2012 | Swildens et al. |

(Continued)

OTHER PUBLICATIONS

International Preliminary Report on Patentability dated Jul. 4, 2017, Int'l Appl. No. PCT/US15/068288, Int'l Filing Date Dec. 31, 2015; 9 pgs.

(Continued)

*Primary Examiner* — Thu Ha T Nguyen

(57) ABSTRACT

A content delivery network with at least one first content server bound to a first domain associated with a first characteristic (e.g., popular) associated with content servable from the content delivery network. The content delivery network includes at least one second content server bound to a second domain associated with a second characteristic (e.g., unpopular) associated with content servable from the content delivery network. At least one processing device including computer executable instructions for receiving a request to provide an embedded resource including either a first host name associated with the first domain or a second host name associated with the second domain.

20 Claims, 5 Drawing Sheets

(56) References Cited

U.S. PATENT DOCUMENTS

| | | | |
|---|---|---|---|
| 8,281,035 B2 | 10/2012 | Farber et al. | |
| 8,291,046 B2 | 10/2012 | Farber et al. | |
| 8,291,117 B1* | 10/2012 | Eggleston | H04L 61/1511 |
| | | | 709/245 |
| 8,296,396 B2 | 10/2012 | Farber et al. | |
| 8,463,877 B1* | 6/2013 | Richardson | H04L 67/327 |
| | | | 709/219 |
| 8,468,245 B2 | 6/2013 | Farber et al. | |
| 8,473,613 B2 | 6/2013 | Farber et al. | |
| 8,478,903 B2 | 7/2013 | Farber et al. | |
| 8,572,208 B2 | 10/2013 | Farber et al. | |
| 8,572,210 B2 | 10/2013 | Farber et al. | |
| 8,683,076 B2 | 3/2014 | Farber et al. | |
| 2002/0010798 A1* | 1/2002 | Ben-Shaul | G06F 17/3089 |
| | | | 709/247 |
| 2002/0078192 A1* | 6/2002 | Kopsell | H04L 67/02 |
| | | | 709/223 |
| 2002/0078233 A1* | 6/2002 | Biliris | H04L 29/06 |
| | | | 709/238 |
| 2003/0069943 A1* | 4/2003 | Bahrs | H04L 29/06 |
| | | | 709/219 |
| 2004/0073707 A1* | 4/2004 | Dillon | H04L 29/12009 |
| | | | 709/245 |
| 2004/0205557 A1* | 10/2004 | Bahrs | G06F 17/30876 |
| | | | 715/239 |
| 2006/0218289 A1* | 9/2006 | Assad | H04L 29/12122 |
| | | | 709/229 |
| 2008/0033935 A1* | 2/2008 | Frank | G06F 3/0481 |
| 2008/0065685 A1* | 3/2008 | Frank | G06F 17/30241 |
| 2009/0254661 A1 | 10/2009 | Fullagar et al. | |
| 2009/0282038 A1* | 11/2009 | Subotin | G06F 17/30705 |
| 2010/0125675 A1 | 5/2010 | Richardson et al. | |
| 2010/0205541 A1* | 8/2010 | Rapaport | G06Q 10/10 |
| | | | 715/753 |
| 2010/0332595 A1 | 12/2010 | Fullagar et al. | |
| 2014/0289319 A1* | 9/2014 | Richardson | H04L 67/2814 |
| | | | 709/203 |
| 2015/0067833 A1* | 3/2015 | Verma | H04L 63/1483 |
| | | | 726/22 |
| 2015/0195243 A1* | 7/2015 | Roskind | H04L 61/1511 |
| | | | 709/213 |
| 2016/0191456 A1* | 6/2016 | Newton | H04L 67/02 |
| | | | 709/226 |
| 2016/0234330 A1* | 8/2016 | Popowitz | H04L 67/2814 |
| 2016/0255042 A1* | 9/2016 | Newton | H04L 47/70 |
| | | | 709/245 |
| 2018/0158068 A1* | 6/2018 | Ker | H04L 67/22 |

OTHER PUBLICATIONS

International Search Report dated Mar. 7, 2016, Int'l Appl. No. PCT/US15/068288, Int'l Filing Date Dec. 31, 2015; 3 pgs.

Written Opinion of the International Searching Authority dated Mar. 7, 2016, Int'l Appl. No. PCT/US15/068288, Int'l Filing Date Dec. 31, 2015; 7 pgs.

Singapore Written Opinion, dated Jan. 31, 2018, Application No. 11201705144R, filed Dec. 31, 2015; 7 pgs.

Extended European Search Report, dated Jun. 1, 2018, Application No. 15876354.0, filed Dec. 31, 2015; 6 pgs.

* cited by examiner

NETWORK ADDRESS RESOLUTION

RELATED APPLICATIONS

This application claims priority under 35 U.S.C. § 119 from U.S. provisional application No. 62/098,940 entitled "NETWORK ADDRESS RESOLUTION," filed on Dec. 31, 2014, the entire contents of which are fully incorporated by reference herein for all purposes.

TECHNICAL FIELD

Aspects of the present disclosure relate to network address resolution, and particularly involve the assignment of enhanced domains to content, and the use of those enhanced domains to tie the delivery of the content to particular content server tiers within a CDN where the domains and associated tiers are aligned with the popularity of the content.

BACKGROUND

The Internet and the World Wide Web (the "Web") have become ubiquitous. Content providers (publishers) now use the Internet (and, particularly, the Web) to provide all sorts of content to numerous clients all over the world. In order to offload the job of serving some or all of their content, many content providers now subscribe to content delivery networks (CDNs). Using a CDN, content can be served to clients from the CDN (e.g., from one or more servers in the CDN) instead of from the content provider's server(s). In a caching CDN, content may also be cached on some or all of the CDN servers, either before being served or in response to specific requests for that content. Having content cached within edge servers of the CDN enhances the performance of the CDN because the content does not have to be retrieved from mid-tier origin servers or other locations, which are less efficient than edge servers in providing content.

Numerous forms of content may be served from the CDN. For example, television shows and movies may now be accessed from any number of Web sites, and the shows and movies may actually be served from the CDN. Print newspapers have migrated to the Web and provide portals through which clients operating some form of computing device (e.g., PC, smart phone, or tablet), with a browser may access numerous forms of content, such as short video clips, articles, images, and audio tracks. Software updates and patches, once only provided on disc and mailed to recipients, are now routinely distributed to devices using only network connections, and the updates and patches are delivered from a CDN.

It is with these observations in mind, among others, that various aspects of the present disclosure were conceived and developed.

SUMMARY

Embodiments of the disclosure include a content delivery method comprising the operations of receiving a content request at a content server bound to a domain, the domain associated with a characteristic of the content, the request being associated with a host name associated with the characteristic of the content and assigned at an origin of the content, and serving the content.

Embodiments further involve an apparatus comprising at least one processor device in communication with a tangible computer readable medium including computer executable instructions for receiving an association of a resource to at least one of a first characteristic or a second characteristic of the resource. The instructions further include assigning the resource to a first domain associated with the first characteristic when the resource is indicated as having the first characteristic, the first domain bound with at least one first content server of a content delivery network and from which a connection may be made to obtain the resource. Finally, the instructions may further include assigning the resource to a second domain associated with the second characteristic when the resource is indicated as having the second characteristic, the second domain bound with at least one second content server of a content delivery network and from which a connection may be made to obtain the resource.

These and other embodiments are discussed in more detail below.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. Also, in the drawings the like reference characters may refer to the same parts throughout the different views. The drawings depict only typical embodiments of the present disclosure and, therefore, are not to be considered limiting in scope.

DETAILED DESCRIPTION

Figure 1:
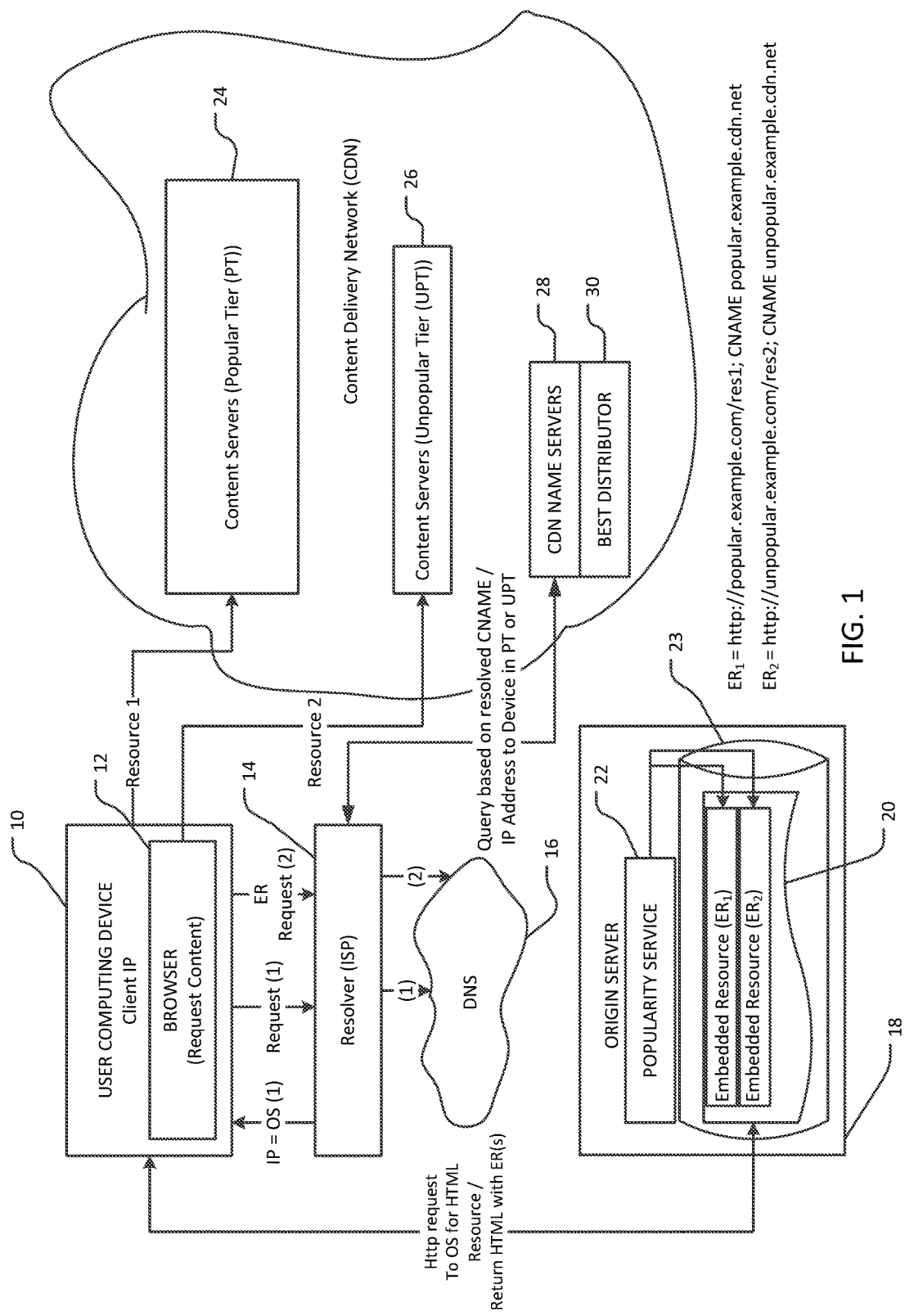
FIG. 1 is a system diagram illustrating a content delivery network whereby popularity or some other content characteristic is assigned to the content at the origin, such as through a designated enhanced host name bound to a server tier that serves the content.

Aspects of the present disclosure involve systems and methods for selecting an edge server, rack, cluster or other device, which may be in a content delivery network (CDN), to serve content to a client. Aspects of the present disclosure involve delegating popularity assignment of a resource to a customer of the CDN. In one example, the popularity designation may take the form of assigning an enhanced host name to a resource at the origin server for the resource. Namely, within the origin server or in association therewith, a host name for a resource may be assigned or otherwise defined based on the popularity of the resource. In one possible implementation, a popular host name and an unpopular host name, or any number of host names linked to popularity, in addition to other characteristics alternatively or additionally to popularity, may be available for assignment to content. So, for example, popular content is assigned to the popular domain whereas unpopular content is assigned to the unpopular domain, and appropriate URL's are created reflecting such assignments. As discussed herein, the origin server for content is the source for content from any given content provider. In many instances, content becomes distributed across many nodes within a network but the original source for that content, and from which the content is distributed to such nodes, is the origin server, which may be a collection of origin servers and may be maintained by a customer or delegated or otherwise maintained by third parties, including the CDN provider. Thus, when a customer assigns a resource to a popular or unpopular host name at the origin server, that assignment may remain associated with the content until altered at the origin server.

Within the CDN, one or more content server tiers may be arranged to serve both popular and unpopular content, with servers within each tier bound to the popular or unpopular domain. For example, a relatively large number of content servers, positioned proximate or otherwise geographically relative to various possible client locations, may be bound to the popular domain. Popular content requests from a client will be resolved by the CDN to a server within the popular tier, from where it will be served. As the content is deemed popular at the origin, the content will initially be accessed from a machine within the popular tier, and then, depending on the architecture of the CDN, may then be cached at that machine.

The term "content" as used herein means any kind of data, in any form, regardless of its representation and regardless of what it represents. The term "content" may include, without limitation, static and/or dynamic images, text, audio content, including streamed audio, video content, including streamed video, web pages, computer programs, documents, files, and the like. Some content may be embedded in other content, e.g., using markup languages such as HTML and XML. Content includes content which is created or formed or composed specifically in response to a particular request. The term "resource" is sometimes used herein to refer to content.

Figure 2:
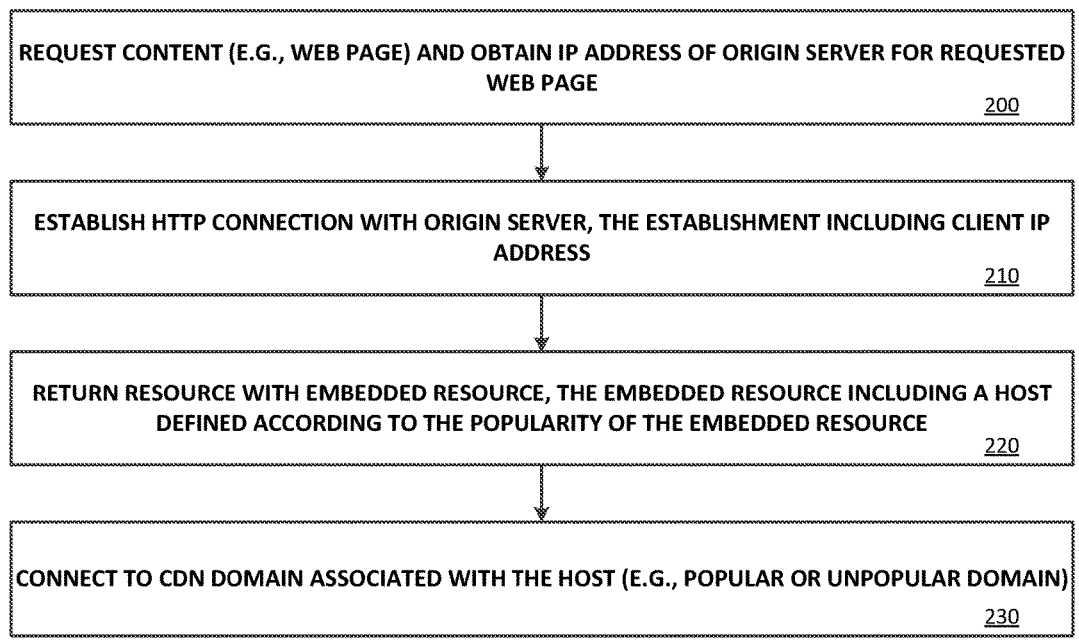
FIG. 2 is a flow diagram illustrating a method of delivering content using an enhanced host name, assigned at the origin, that is associated with a characteristic of the content, such as popularity, as assigned at the origin.
Figure 3:
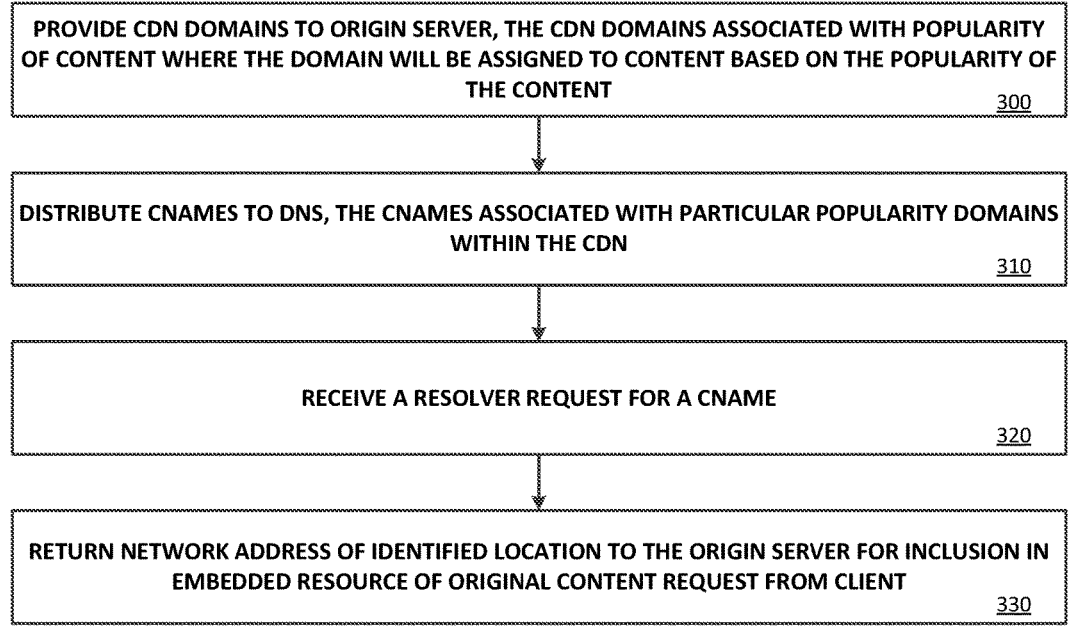
FIG. 3 is a flow diagram illustrating a method of using CNAMES linked with popularity domains of the CDN.

FIG. 1 illustrates one example network configuration for practicing aspects of the present disclosure, while FIGS. 2 and 3 describe methods. The illustrated network would include many other components involved in servicing a request and providing content; however, the diagram here focuses on only some components involved in the system and one of ordinary skill will readily understand other conventional components within the network. With respect to content delivery, in this example, a request originates from a computing device 10 operating a browser 12. The computing device may be some form of conventional device such as personal computer, a thin client, a tablet, a smart phone, a set-top box, a cable box, or the like, that is capable of running a browser and providing a user with the ability to request content over a network connection, or some other application suitable for interacting with a network and requesting content therefrom. The user device may be a consumer device deployed in a public network, may be an enterprise device deployed in private network or other type of device. The network connection, in many instances, will be provided by an Internet service provider (ISP) operating one or more resolvers 14. A resolver (also referred to as a DNS resolver) is a client-side device used to resolve a network address (e.g., translate a domain name into an Internet protocol (IP) address) for a requested resource. Generally speaking, the resolver contacts (e.g., queries) a DNS infrastructure 16, which may involve many different components, to resolve a network address for a resource.

To illustrate aspects of the disclosure, consider when a user enters, into the browser, a web page address http://www.example.com. The browser 12 contacts or otherwise interacts with the resolver 14, which in turn requests the IP address for the www.example.com Web page from DNS 16 (operation 200). DNS returns the IP address of an origin server 18 capable of delivering a hypertext markup language (HTML) document 20 that will render the Web page in the browser. The present flow discusses contacting an origin server for the Web page; however, this is done for explanation purposes, and it is possible that DNS may resolve the request to some other device for obtaining the Web page. In order to obtain the HTML document, the client device establishes a TCP connection, which may encapsulate an HTTP protocol communication, with the origin server (operation 210). Embodiments discussed herein may reference HTML documents but such reference should not be considered restrictive, and other container objects may also be utilized, such as XML documents. An origin server is a device (or collection of devices) maintaining original copies of content for distribution to client's and/or distribution of copies to other nodes. While the present disclosure is illustrated in association with a connection to an origin server, the connection may instead be made with some other device designated in DNS to serve the requested resource (ER). In this example, the origin server is connected with a database 23, which organizes and manages stored resources in some form of storage device (or devices), such as a storage appliance, that includes the HTML document with the embedded resource. The HTML document is what the browser uses to display the Web page www.example.com. In this example, the embedded resource is a link (e.g., a URL) to some form of content that the user can obtain by selecting the link when the Web page is displayed. In the case of an online news site, the home page or any number of sub-pages (HTML documents) may include any number of links to content (embedded resources) such as articles, short video clips, etc. In the case of a television or movie portal, the home page or any number of sub-pages, may include any number of links to particular episodes of a television series, specific movie releases, or other content.

When the origin server receives the request (or at some time prior to receiving the request), the origin server or a device associated therewith, such as a popularity service 22, pre-designates the embedded resource as either popular or non-popular. In this example, a customer of the CDN is presumed to understand the popularity of its content, and thus can assign popularity to the content. Within the origin server, embedded resources—specific instances of content—are designated as popular or unpopular through the association of that content with a popular or unpopular domain (or any number of domains linked to popularity designations for content). For example, consider the case where www.example.com is the home page for an on-line video provider and the embedded resource is a link to a recently released movie that did well in theaters. In such an example, when the movie is released by the video provider, it may initially be presumed to be quite popular, and thus the content may be assigned to the popular domain. In the same example, the customer may preset the popularity to "high," for example, based on its understanding that the initial release of the video will be highly popular among its subscribers (user base). The scale of popularity may be in any number of possible forms. In the examples discussed herein, content is either popular or non-popular. However, popularity may be designated in others scales, such as 1=low, 2=medium, 3=high, scale of 1-10 with 1 being unpopular and 10 being the most popular, etc. Moreover, the scale may be adjusted from an initial designation based on the number of requests for the content, which may be based on discrete times (e.g., number of requests per day, per minute, per second, etc.). Finally, popularity may also be regionalized. For example, a resource in the case of a news story may initially be considered to be popular in the region from which it originates but un-popular in other regions. Say, for example, the case of a breaking news story in Atlanta, the on-line news story (embedded resource) may be designated popular for Georgia or the Southeast of the United States, but may be designated unpopular for all other geographic regions. The popularity service 22 may provide a user interface to designate popularity and attributes thereof, or may be a service that automatically designates popularity.

To provide a popularity designation at DNS time, an enhanced host name is provided for the embedded resource (operation 300), and the enhanced host name associated resources are returned in the resource requested (operation 220). In one example, the enhanced host name is operably associated with a CDN from which the content will be delivered. Moreover, the enhanced host name operably associates the content to physical content servers of the CDN from which the content will be delivered. The CDN architecture may reflect the popular versus unpopular content by providing more and diverse content delivery sources to provide the popular content relative to the unpopular content. For some content, such as particularly unpopular content, the returned enhanced host name may direct the requesting device (e.g., a client) to the origin server of the content rather than a CDN node.

With respect to the enhanced host names, in one example, if resource 1 (e.g., a recently released block buster movie) is considered popular and resource 2 (e.g., a very old esoteric documentary film) is considered unpopular, then two enhanced host names may be: Embedded resource 1 (ER1) =http://popular.example.com/res1 (for the popular content) and Embedded resource 2 (ER2)=http://unpopular.example.com/res2 (for the unpopular content). Here, the popular URL host name and the unpopular URL host name are embedded within the resources (links) of the HTML page from which a user may request either of the resources. Thus, popularity is being designated at the origin server and thus when the HTML, or other resource, including the embedded resources is returned to the requesting client, any subsequent selection by the client to obtain those embedded resources presupposes the popularity of those resources and ultimately directs the request to either a set of content servers configured to deliver popular content or a set of servers configured to deliver unpopular content, within the CDN.

Returning to the client request, the HTML document is returned to the client with the embedded resources as described above. When the client then selects either the popular or unpopular content, the browser again communicates with the ISP resolver to look-up (through DNS) the enhanced host name associated with the resource and connects with the appropriate domain (operation 230), which domain may be within a CDN. Using the popular example, the ISP resolver would contact DNS to resolve popular.example.com. In one specific implementation, DNS would include a CNAME for the popular and unpopular domains, which CNAMES were distributed to DNS (operation 310). For example, DNS would include, for the popular content, CNAME=popular.example.cdn.net and for the unpopular content, CNAME=unpopular.example.cdn.net. The CNAME's in DNS either point to the popular or unpopular domain within the CDN. The popular domain is bound to a set of machines 24 to handle the demands of serving high volumes of requests that are typically associated with popular content, whereas the unpopular domain is bound to a set of machines 26 to handle the demands of serving relatively lower volumes of requests associated with unpopular content. For example, the popular domain may be bound to a larger set of machines, which may also be dispersed along the edges of the CDN and may be high performance machines, whereas the unpopular domain may be bound to a relatively smaller set of machines, or lower performance machines, which may not be positioned at the edges of the CDN or as widely distributed across the CDN.

It is possible that the popular set of nodes may be a superset of the unpopular set of nodes, or may be a disjointed set. In such instances, when content transistions from popular to non-popular or non-popular to popular, a transitional time may be configured. Initially, a majority of responses will employ a non-enhanced host name and will transition to an enhanced host name to allow new CDN nodes to fill the content prior to having to serve the entire population of requestors.

The CNAME causes a DNS look-up to resolve the IP address for the content (operation 320). In one example, CDN name servers 28 will be a part of the DNS look-up, and the CDN name servers may use some form of intelligent traffic management (ITM) (best distributor algorithms) 30 to direct the client to obtain the content from a content server in the relevant domain. More particularly, the CDN name servers and the ITM may return an IP address (or other location) for the best server node within the CDN to deliver the content and to provide as a modified embedded resource (operation 330). For popular content, the node will be within the popular tier, for unpopular content, the node will be in the unpopular tier.

The ITM may return an address that is optimally suited to serve the content to the requesting client. So, in a simple example, for a user in New York requesting popular content from a CDN having nodes capable of serving the content from both California and New York, it may not be optimal to serve the content from California due to any number of reasons including cost, latency, quality, optimal CDN use, and the like. In the present system, the ITM may instead return the New York node to the client in New York. Note, in one example, the CDN name servers may use the resolver location as a proxy for the requesting client location.

Besides client information, including geography, and popularity, the origin server may use other information such as policy information, political information, restrictions, etc., when designating a tier For example, the distribution of some content may be geographically limited—e.g., obtaining real-time sporting content may be limited in the geographic area of one or both teams participating in the event. Some content may have geopolitical distribution restrictions.

Such information may be provided by selecting amongst a set of pre-defined enhanced host names, or by embedding such additional information in fields within the host name. For example, enhanced host names such as popular-us.example.com or unpopular-global.example.com may be used to designate popular content in the United States (through the "us" embellishment of the enhanced host) only or globally unpopular content (through the "global" embellishment of the enhanced host), respectively. Alternatively, embedded fields may be used such as pop10.us.example.com (for very popular, US only resources) or pop2.us-ca-eu.example.com (for not so popular, but could be served from US ("us" designation), Canada ("ca" designation) or Europe ("eu" designation) resources.

The ITM may take into account and use the IP address of the client device (client IP), the IP address of the resolver (resolver IP), customer, and the various other forms of information in determining the node from which to serve the content. For example, the ITM may use geographical information to pick the node closest to the client to serve the content. The computing engine may further take into account network traffic, and if the closest node is too busy, then select another node that is close but less busy.

In some instances, for example, the node may not yet have the content, and upon receiving the request, have to request the content from an origin server, another node, or elsewhere. In such instances, the instruction would cause the node to cache and retain the content and be able to directly serve the next request.

The CDN name servers 28 return the determined network address to the requesting client device 10, and the browser 12 then may establish a connection with the CDN node designated to serve the embedded resource. The designated node will either have the embedded resource, or it will obtain the content and serve it to the requesting client. Within the CDN, as client's request content, the popular tier nodes 24 will quickly have all of the content cached and be able to deliver the content directly upon receiving a request from a client.

Figure 4:
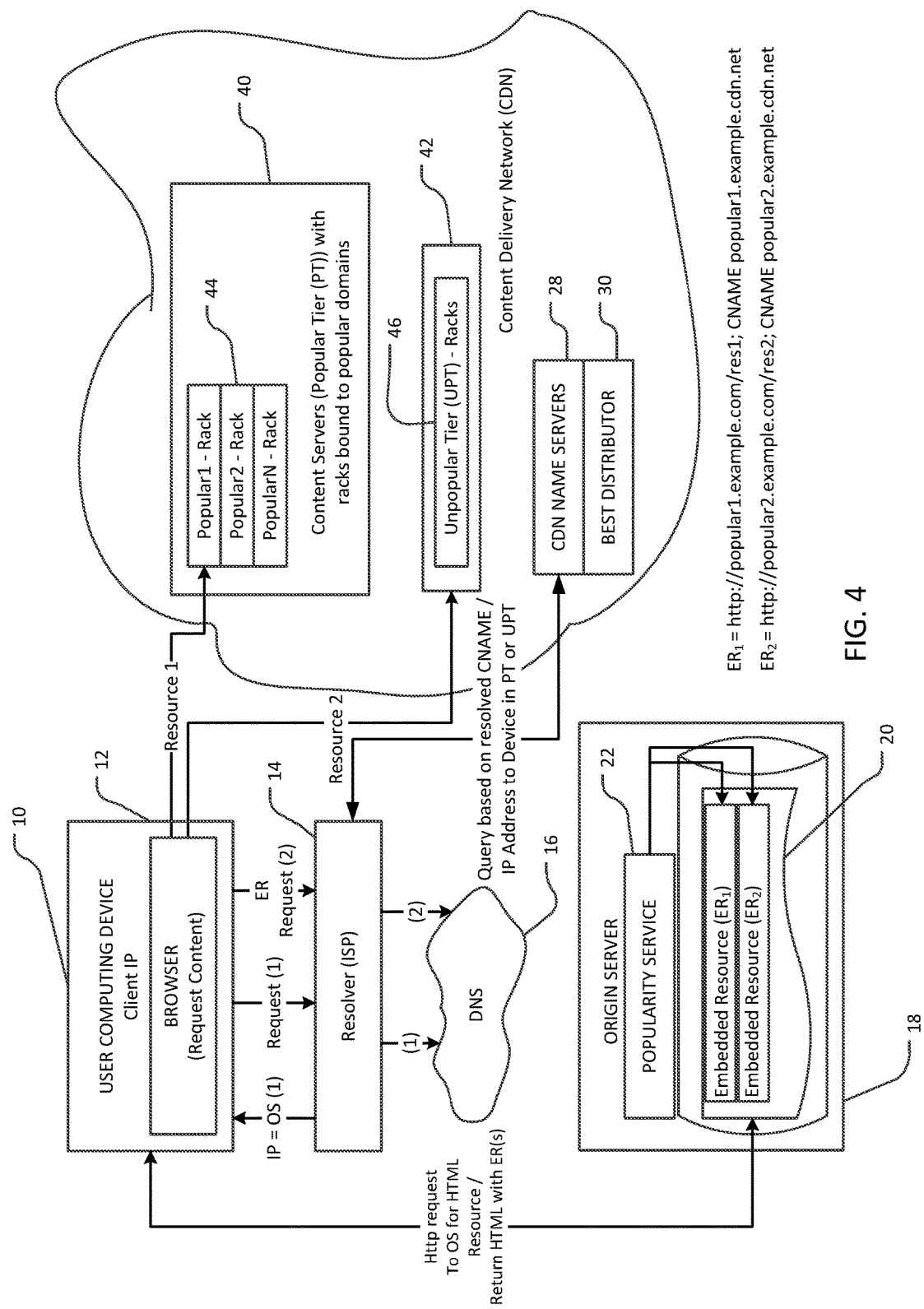
FIG. 4 is a system diagram illustrating a content delivery network whereby popularity or some other content characteristic is assigned to the content at the origin, such as through a designated enhanced host name bound to a plurality of server tiers tied to popularity designations and that serve the content.

For any customer of the CDN, particularly those with large libraries of content, such content may be sharded or otherwise spread across nodes based on popularity. For a particularly large content library, a single rack of content servers may be incapable of storing the content library. In such an instance or for any number of reasons, the content library may be subdivided or "sharded" into slices, with the various slices each stored in distinct racks. To achieve this end, and referring to FIG. 4, within one possible implementation of the current disclosure, the CDN may have any number of popular and unpopular domains (referred to as a first domain 40 and a second domain 42 for purposes of example) and those domains may be bound to racks 44, 46 within the CDN. For instance, a library of 40,000 movies with 10,000 popular movies and 30,000 relatively unpopular movies, may be sharded into two 5,000 movie slices of popular movies, and six 5,000 movie slices of unpopular movies. In such a situation, the CDN may provide two popular domains and six unpopular domains, with machines 24 bound to the popular domain and machines 26 bound to the unpopular domains to store and serve the content. Appropriate CNAMEs may be provided to DNS so that the CDN name servers Sticking with the example of popular content, the CDN may provide to a customer two popular domains to assign to popular content. When defining an embedded resource for a specific popular resource, the customer assigns one of the two popular domains to the content. Referring to FIG. 4, if popular resource 1 is assigned to popular domain 1, then a client request for the popular resource 1 will return an address for a content machine bound to the popular 1 domain. More particularly, the initial request, by way of the CNAME, will cause a query to the CDN name servers 28 and any associated best distributor (e.g., ITM) infrastructure 30. The resolved request, will return information to contact the appropriate domain (e.g., domains 40 and 42) and associated tiers (e.g., tiers 44 and 46).

Figure 5:
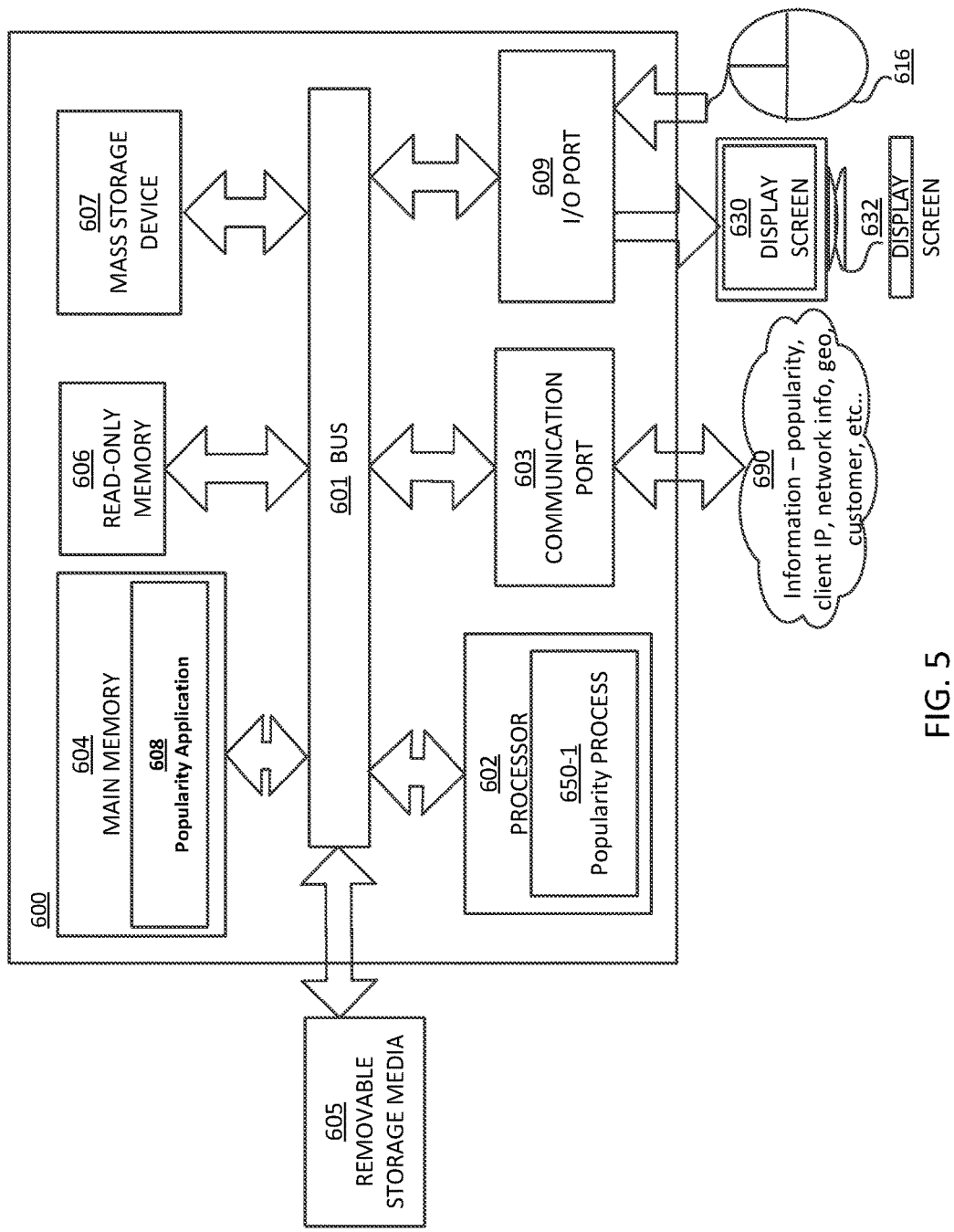
FIG. 5 is an example of a computing system that may implement various systems and methods discussed herein.

FIG. 5 is an example schematic diagram of a computing system 600 that may implement various methodologies discussed herein. The computing system for the application 608 includes a bus 601 (i.e., interconnect), at least one processor 602 or other compute element, at least one communication port 603, a main memory 604, a removable storage media 605, a read-only memory 606, and a mass storage device 607. Processor(s) 602 can be any known processor, such as, but not limited to, an Intel® Itanium® or Itanium 2® processor(s), AMD® Opteron® or Athlon MP® processor(s), or Motorola® lines of processors. Communication port 603 can be any of an RS-232 port for use with a modem based dial-up connection, a 10/100 Ethernet port, a Gigabit port using copper or fiber, or a USB port. Communication port(s) 603 may be chosen depending on a network such as a Local Area Network (LAN), a Wide Area Network (WAN), or any network to which the computer system 600 connects. The rendezvous application may be in communication with peripheral devices (e.g., display screen 630, input device 616 via Input/Output (I/O) port 609.

Main memory 604 can be Random Access Memory (RAM) or any other dynamic storage device(s) commonly known in the art. Read-only memory 606 can be any static storage device(s) such as Programmable Read-Only Memory (PROM) chips for storing static information such as instructions for processor 602. Mass storage device 607 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus 601 communicatively couples processor(s) 602 with the other memory, storage and communications blocks. Bus 601 can be a PCI/PCI-X, SCSI, or Universal Serial Bus (USB) based system bus (or other) depending on the storage devices used. Removable storage media 605 can be any kind of external hard drives, thumb drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/ machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 604 may be encoded with a popularity application 608 that perform a popularity service 650-1 at the processor (or processors), relating to the provision of an enhanced embedded resource using designated domains (e.g., popular or unpopular) related to CDN content deliver tiers, a rendezvous application or service, or other various methodologies as discussed herein. For example, in one embodiment, the popularity application 650-1 may include or otherwise implement the various processes and/or instructions described herein. The application 650-1 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 602 accesses main memory 604 via the use of bus 601 in order to launch, run, execute, interpret or otherwise perform the logic instructions of the 650-1.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages should be understood by the foregoing description, and it should be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A content delivery method comprising:
assigning a first characteristic to first content;
assigning a second characteristic to second content;
binding a first server to a first domain;
binding a second server to a second domain;
after binding the first server to the first domain, receiving a request for a webpage;
in response to receiving the request for the webpage:
assigning a first host name to a first embedded resource based on the first characteristic of the first content;
assigning a second host name to a second embedded resource based on the second characteristic of the second content;and
returning the first host name and the second host name;
receiving an indication of a selection of the first host name; and
delivering, in response to receiving the indication of the selection of the first host name, the first content from the first domain using at least the first server.

2. The method of claim 1, wherein the characteristic of the first content and the characteristic of the second content each relates to popularity of the content.

3. The method of claim 2, wherein the first domain serves popular content.

4. The method of claim 1, wherein the first host name is an enhanced host name with a field associated with the characteristic of the first content.

5. The method of claim 4, wherein the first host name has a form of characteristic.host.topleveldomain.

6. A
tangible computer readable medium storing computer executable instructions for:
assigning a first characteristic to first content;
assigning a second characteristic to second content;
binding a first server to a first domain;
binding a second server to a second domain;
after binding the first server to the first domain, receiving a request for a webpage;
in response to receiving the request for the webpage:
assigning a first host name to a first embedded resource based on the first characteristic of the first content;
assigning a second host name to a second embedded resource based on the second characteristic of the second content; and
returning the first host name and the second host name;
receiving an indication of a selection of the first host name; and
delivering, in response to receiving the indication of the selection of the first host name, the first content from the first domain using at least the first server.

7. The tangible computer readable medium of claim 6, wherein the first characteristic relates to a first popularity level of the resource and wherein the second characteristic relates a second popularity level of the resource, the first popularity level different from the second popularity level.

8. The tangible computer readable medium of claim 7, wherein the computer executable instructions further include defining an embedded resource to include in an HTML document.

9. The tangible computer readable medium of claim 8, wherein the computer executable instructions generate a first CNAME referencing the first domain and a second CNAME referencing the second domain.

10. The tangible computer readable medium of claim 7, wherein the first domain and the second domain are part of a content delivery network that includes at least one additional domain associated with at least one additional characteristic.

11. The tangible computer readable medium of claim 10, wherein the content delivery network includes at least one additional domain associated with the first characteristic and at least one additional domain associated with the second characteristic.

12. A system comprising:
- at least one processor;
- computer readable media communicatively connected to the at least one processor, the computer readable media storing instructions that, when executed by the at least one processor, cause the system to perform a method, the method comprising:
- assigning a first characteristic to first content;
- assigning a second characteristic to second content;
- binding a first server to a first domain;
- binding a second server to a second domain;
- after binding the first server to the first domain, receiving a request for a webpage;
- in response to receiving the request for the webpage:
  - assigning a first host name to a first embedded resource based on the first characteristic of the first content;
  - assigning a second host name to a second embedded resource based on the second characteristic of the second content; and
  - returning the first host name and the second host name; receiving an indication of a selection of the first host name; in response to receiving the indication of the selection of the first host name:
    - caching the first content at the first server; and
    - delivering, in response to receiving the indication of the selection of the first host name, the first content from the first domain using at least the first server.

13. The system of claim 12, wherein the characteristic of the first content and the characteristic of the second content each relates to popularity of the content.

14. The system of claim 13, wherein the first server is dedicated to serving popular content.

15. The system of claim 14, wherein the first host name is an enhanced host name with a field associated with the characteristic of the first content.

16. The system of claim 15, wherein the first host name has a form of characteristic.host.topleveldomain.

17. The system of claim 15, wherein the first domain and the second domain are part of a content delivery network that includes at least one additional domain associated with at least one additional characteristic.

18. The system of claim 17, wherein the content delivery network includes at least one additional domain associated with the first characteristic and at least one additional domain associated with the second characteristic.

19. The system of claim 12, wherein the first host name is a first CNAME referencing the first domain.

20. The system of claim 12, wherein the first content includes an HTML document.

* * * * *